United States Patent
Banerjee et al.

(10) Patent No.: US 9,563,188 B2
(45) Date of Patent: *Feb. 7, 2017

(54) SYSTEMS AND METHODS FOR BATCH DEVICE COMMISSIONING AND DECOMMISSIONING

(71) Applicant: General Electric Company, Schenectady, NY (US)

(72) Inventors: Abhik Banerjee, Hyderabad (IN); John Alexander Petzen, III, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 13/957,230

(22) Filed: Aug. 1, 2013

(65) Prior Publication Data
US 2015/0039130 A1    Feb. 5, 2015

(51) Int. Cl.
G05B 15/02    (2006.01)
G05B 19/418   (2006.01)

(52) U.S. Cl.
CPC ......... G05B 15/02 (2013.01); G05B 19/41845 (2013.01); *G05B 2219/25428* (2013.01);
(Continued)

(58) Field of Classification Search
CPC ............................................. G05B 19/41845
(Continued)

(56) References Cited

U.S. PATENT DOCUMENTS 5,980,078 A * 11/1999 Krivoshein ...... G05B 19/41865
                                                    700/1
6,618,630 B1    9/2003 Jundt et al.
(Continued)

FOREIGN PATENT DOCUMENTS

EP       2530548 A2 * 12/2012  ......... H04L 12/2825
WO    2007121141 A2    10/2007

OTHER PUBLICATIONS

Echelon Corporation, "LonMaker User's Guide" 2003 Release 3.1 Revision 2, 302 pages.*
(Continued)

*Primary Examiner* — Mohammad Ali
*Assistant Examiner* — Emilio J Saavedra
(74) *Attorney, Agent, or Firm* — Fletcher Yoder, P.C.

(57) ABSTRACT

The embodiments described herein include a system, non-transitory tangible computer-readable medium including executable code, and a method. In one embodiment, a non-transitory tangible computer-readable medium including executable code is provided. The executable code includes instructions for providing a batch commissioning system configured to operatively couple at least two field devices to a control system, and for providing a batch decommissioning system configured to operatively uncouple the at least two field devices from the control system. The executable code further includes instructions for providing a graphical user interface (GUI) configured to use the batch commissioning system, the batch decommissioning system, or a combination thereof, to select, on a display, the at least two field devices, and to communicatively interface with the control system to operatively couple, uncouple, or a combination thereof, the at least two field device from the control system.

18 Claims, 5 Drawing Sheets

(52) U.S. Cl.
CPC ............... *G05B 2219/31121* (2013.01); *G05B 2219/31134* (2013.01); *G05B 2219/31334* (2013.01); *G05B 2219/32137* (2013.01); *G05B 2219/32144* (2013.01); *Y02P 90/16* (2015.11); *Y02P 90/185* (2015.11)

(58) Field of Classification Search
USPC ........................................................ 700/275
See application file for complete search history.

(56) References Cited

U.S. PATENT DOCUMENTS

| | | |
|---|---|---|
| 7,272,457 B2 | 9/2007 | Glanzer et al. |
| 7,460,865 B2 | 12/2008 | Nixon et al. |
| 7,594,226 B2 | 9/2009 | Stelzer et al. |
| 8,005,553 B2 | 8/2011 | Enver et al. |
| 8,452,675 B2 | 5/2013 | Broom |
| 8,527,888 B2 | 9/2013 | Bump et al. |
| 8,578,059 B2 | 11/2013 | Odayappan et al. |
| 2007/0250180 A1 | 10/2007 | Bump et al. |
| 2008/0004727 A1 | 1/2008 | Glanzer et al. |

OTHER PUBLICATIONS

Berge, "Fieldbus Foundation FAT & Commissioning" Manila End-User Seminar, Sep. 23, 2008, 19 pgs.*
Berge et al., "Fieldbus Foundation FAT & Commissioning", Manila End-User Seminar, pp. 1-19, Sep. 23, 2008.
European Search Report issued in connection with corresponding EP Application No. 14178865.3 on Dec. 4, 2014.

* cited by examiner

SYSTEMS AND METHODS FOR BATCH DEVICE COMMISSIONING AND DECOMMISSIONING

BACKGROUND OF THE INVENTION

The subject matter disclosed herein relates to the commissioning and decommissioning of devices, and more specifically, to the batch commissioning and decommissioning of field devices.

Certain systems, such as industrial control systems, may provide for control capabilities that enable the execution of computer instructions in various types of field devices, such as sensors, pumps, valves, and the like. For example, a field device may be incorporated into a control system operationally coupled to the control system by a commissioning process. Likewise, the field device may be operationally decoupled from the control system by a decommissioning process. However, the field devices may include devices made by different manufacturers, and may have different operational capabilities and programming. Accordingly, commissioning and/or decommissioning the multiple devices may be complex and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory tangible computer-readable medium including executable code is provided. The executable code includes instructions for providing a batch commissioning system configured to operatively couple at least two field devices to a control system, and for providing a batch decommissioning system configured to operatively uncouple the at least two field devices from the control system. The executable code further includes instructions for providing a graphical user interface (GUI) configured to use the batch commissioning system, the batch decommissioning system, or a combination thereof, to select, on a display, the at least two field devices, and to communicatively interface with the control system to operatively couple, uncouple, or a combination thereof, the at least two field device from the control system.

In a second embodiment, a method includes detecting the coupling of a first field device to a control system, and detecting the coupling of a second field device to the control system. The method further includes determining a first state for the first field device, and determining a second state for the second field device. The method additionally includes batch commissioning, batch decommissioning, batch clearing, or a combination thereof, the first and the second field devices.

In a third embodiment, a system is provided. The system includes a processor configure to detect the coupling of a first field device to a control system, and to detect the coupling of a second field device to the control system. The processor is further to determine a first state for the first field device, and to determine a second state for the second field device. The processor is additionally configured to batch commission, batch decommission, batch clear, or a combination thereof, the first and the second field devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
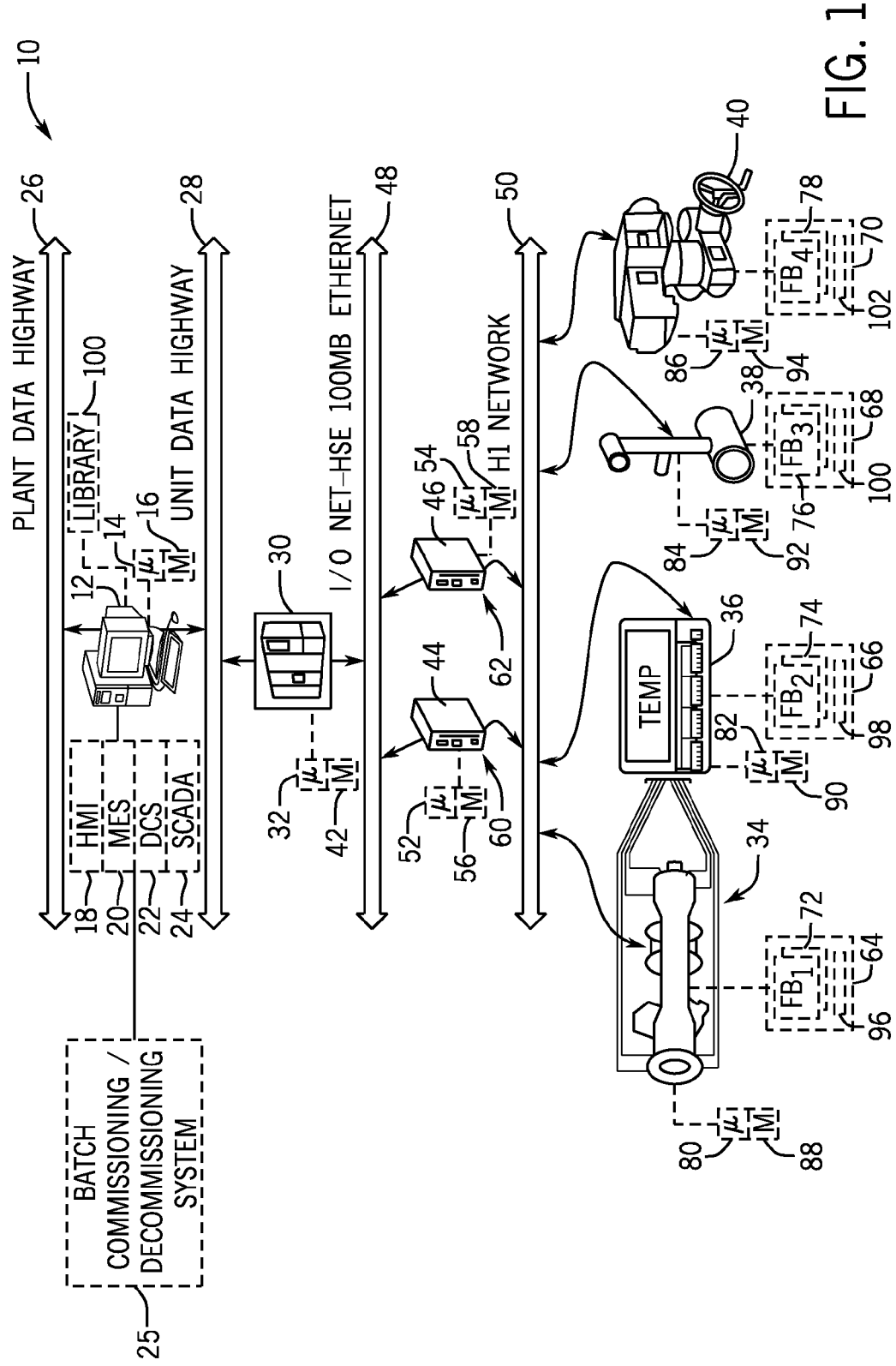
FIG. 1 is a schematic diagram of an embodiment of an industrial control system, including a batch commissioning/decommissioning system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark® VIe controller system, available from General Electric Co., of Schenectady, N.Y., multiple field devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation devices, that include support for the Foundation H1 bi-directional communications protocol. Accordingly, the devices may be communicatively connected with the controller in various communication segments, such as H1 segments, attached to linking devices, to enable a plant-wide network of devices.

The process of enabling a field device to operate as part of a control system is defined as a commissioning process. Similarly, the process of removing a device from the control system while maintaining control system consistency, is defined as a decommissioning process. Advantageously, the systems and methods described herein enable improved batch commissioning and decommissioning processes. That is, multiple devices may be commissioned or decommissioned at one time, thus improving system efficiency and reducing operations cost. In certain embodiments, the batch commissioning of the devices may be more efficiently performed even for devices found to be in a variety of states, including mismatched states, uninitialized states, and initialized states. Likewise, a batch decommissioning of devices may be more efficiently performed by the disclosed embodiments, even for devices including mismatched states, uninitialized states, and initialized states. Similarly, a batch clearing, or the moving of a device into an uninitialized state from a mismatched state or from an initialized state, may also be performed more efficiently using the disclosed embodiments.

In certain embodiments, a graphical user interface (GUI) is provided, including one or more screens suitable for batch commissioning, decommissioning, and clearing of devices. Advantageously, the GUI may include graphical elements that enable more organized and efficient graphical presentation of the devices and their related states, and that may be used for the batch commissioning and/or decommissioning of the devices. For example, once the physical field devices are coupled to a control system, the GUI may show the physical field devices as "decommissioned," and provide for techniques to multiply select more than one of the devices to batch commission the devices. Likewise, the GUI may provide for similar techniques to multiply select previously commissioned devices to batch decommission and/or clear the devices. By enabling batch commissioning, decommissioning, and/or clearing of multiple devices, a more efficient controller configuration process may be enabled.

Turning to FIG. 1, an embodiment of an industrial process control system 10 is depicted. The control system 10 may include a computer system 12 suitable for executing a variety of field device configuration and monitoring applications, and for providing an operator interface through which an engineer or technician may monitor the components of the control system 10. Accordingly, the computer 12 includes a processor 14 that may be used in processing computer instructions, and a memory 16 that may be used to store computer instructions and other data. The computer system 12 may include any type of computing device suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 18, a manufacturing execution system (MES) 20, a distributed control system (DCS) 22, and/or a supervisor control and data acquisition (SCADA) system 24. A batch commissioning/decommissioning system 25 may be included in the HMI 18, MES 20, DCS 22, and/or SCADA 24, and used to batch commission and/or decommission certain devices, as explained in more detail below. The HMI 18, MES 20, DCS 22, SCADA 24 and/or batch commissioning/decommissioning system 25, may be stored as executable code instructions on non-transitory tangible computer readable media, such as the memory 16 of the computer 12. For example, the computer 12 may host the ToolboxST™ and/or ControlST™ software, available from General Electric Co., of Schenectady, N.Y.

Further, the computer system 12 is communicatively connected to a plant data highway 26 suitable for enabling communication between the depicted computer 12 and other computers 12 in the plant. Indeed, the industrial control system 10 may include multiple computer systems 12 interconnected through the plant data highway 26. The computer system 12 may be further communicatively connected to a unit data highway 28, suitable for communicatively coupling the computer system 12 to an industrial controller 30. The industrial controller 30 may include a processor 32 suitable for executing computer instructions or control logic useful in automating a variety of plant equipment, such as a turbine system 34, a temperature sensor 36, a valve 38, and a pump 40. The industrial controller 30 may further include a memory 42 for use in storing, for example, computer instructions and other data. The industrial controller 30 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 30 may be a Mark® VIe controller system, available from General Electric Co., of Schenectady, N.Y.

In the depicted embodiment, the turbine system 34, the temperature sensor 36, the valve 38, and the pump 40 are communicatively connected to the industrial controller 30 by using linking devices 44 and 46 suitable for interfacing between an I/O network 48 and an H1 network 50. As depicted, the linking devices 44 and 46 may include processors 52 and 54, respectively, useful in executing computer instructions, and may also include memory 56 and 58, useful in storing computer instructions and other data. In some embodiments, the I/O network 48 may be a 100 Megabit (MB) high speed Ethernet (HSE) network, and the H1 network 50 may be a 31.25 kilobit/second network. Accordingly, data transmitted and received through the I/O network 48 may in turn be transmitted and received by the H1 network 50. That is, the linking devices 44 and 46 may act as bridges between the I/O network 48 and the H1 network 50. For example, higher speed data on the I/O network 48 may be buffered, and then transmitted at suitable speed on the H1 network 50. Accordingly, a variety of field devices may be linked to the industrial controller 30 and to the computer 12. For example, the field devices 34, 36, 38, and 40 may include or may be industrial devices, such as Fieldbus Foundation devices that include support for the Foundation H1 bi-directional communications protocol. In other embodiments, the field devices 34, 36, 38, and 40 may also include field devices support for other communication protocols, such as those found in the HART® Communications Foundation (HCF) protocol, and the Profibus Nutzer Organization e.V. (PNO) protocol, that may be used in the alternative to the Foundation H1 bi-directional communications protocol.

Each of the linking devices 44 and 46 may include one or more segment ports 60 and 62 useful in segmenting the H1 network 42. For example, the linking device 44 may use the segment port 60 to communicatively couple with the devices 34 and 36, while the linking device 46 may use the segment port 62 to communicatively couple with the devices 38 and 40. Distributing the input/output between the field devices 34, 36, 38, and 40, by using, for example, the segment ports 60 and 62, may enable a physical separation useful in maintaining fault tolerance, redundancy, and improving communications time.

Each field device 34, 36, 38, and 40 may include a respective device description (DD) file, such as the depicted DD files 64, 66, 68, and 70. The DD files 64, 66, 68, and 70 may be written in a device description language (DDL), such as the DDL defined in the International Electrotechnical Commission (IEC) 61804 standard. In some embodiments, the files 64, 66, 68, and 70 are tokenized binary files. That is, the DD files 64, 66, 68, and 70 may include data formatted in a tokenized binary format useful in reducing the size of the DD files 64, 66, 68, and 70. The DD files 64, 66, 68, and 70 may each include one or more function blocks 72, 74, 76, and 78. The function blocks 72, 74, 76, and 78 may include computer instructions or computer logic executable by processors 80, 82, 84, and 86. Indeed, the function blocks 72, 74, 76, and 78 may be instantiated into memory 88, 90, 92, 94, and then executed by the processors 80, 82, 84, and 86, respectively. The each of the DD files 64, 66, 68, and 70 may also include device information 96, 98, 100, and 102, such as manufacturer identification (ID), device type, device revision, DD revision, and/or update revision, which may be used during commissioning or decommissioning by the batch commissioning/decommissioning system 25, as described in more detail below.

In this way, the field devices 34, 36, 38, and 40 may contribute control logic and other computer instructions towards the execution of processes in the industrial process control system 10. Advantageously, the systems and methods disclosed herein provide the user (e.g., control engineer or commissioning engineer) with the batch commissioning/decommissioning system 25 and batch commissioning/decommissioning methods, as described in more detail with respect to FIG. 2.

Figure 2:
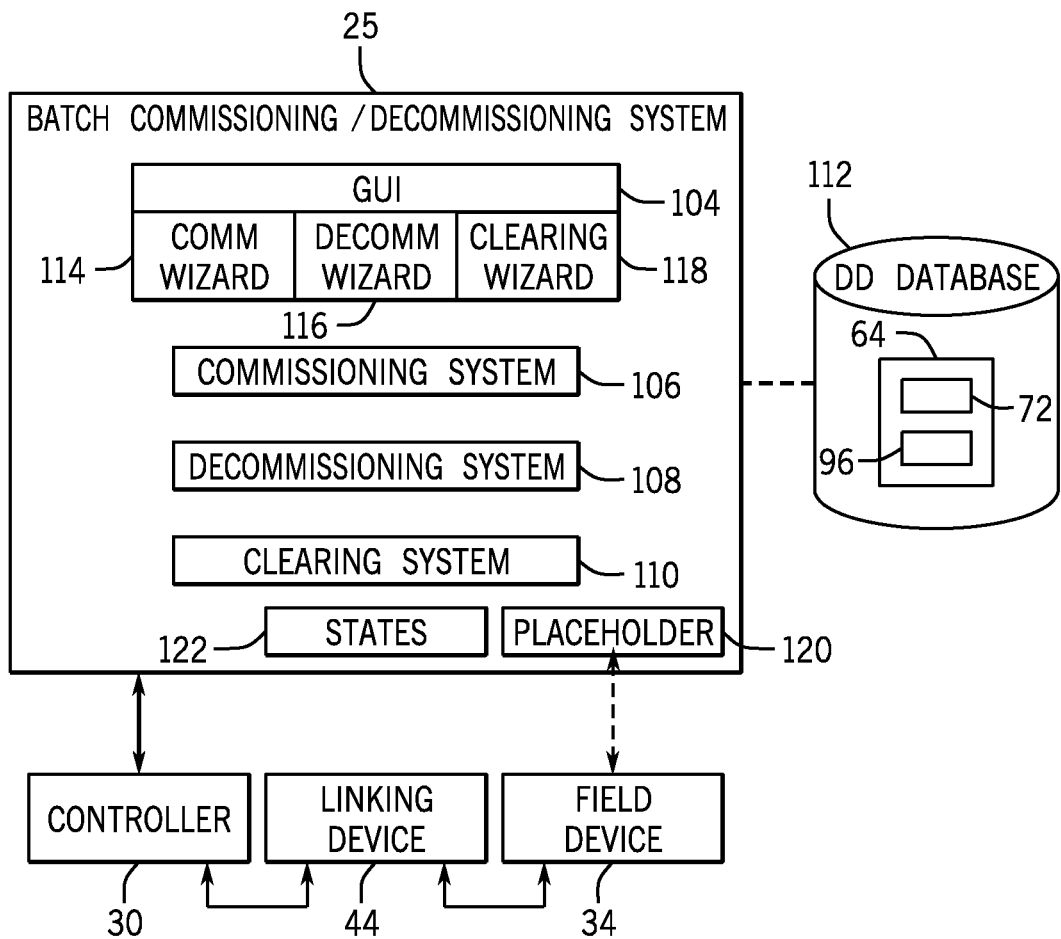
FIG. 2 is a block diagram of the batch commissioning/decommissioning system of FIG. 1.

FIG. 2 is a block diagram illustrating an embodiment of the batch commissioning/decommissioning system 25, which may be used to commission and/or decommission the devices 34, 36, 38, and/or 40 as part of a batch operation. As mentioned above, the batch commissioning/decommissioning system 25 may be included in the HMI 18, the MES 20, the DCS 22, and/or the SCADA 24 and may be stored as executable code instructions on non-transitory tangible computer readable media, such as the memory 16 of the computer 12. In the depicted embodiment, the batch commissioning decommissioning system 25 includes a GUI 104, a batch commissioning system 106, a batch decommissioning system 108, a batch clearing system 110, and a device description (DD) database 112. The GUI 104 may further include a batch commissioning wizard 114, a batch decommissioning wizard 116, and a batch clearing wizard 118, suitable for guiding the user through commissioning, decommissioning, and clearing steps, as described in more detail below. Indeed, the GUI 104 may be used as an interface to the batch commissioning system 106, the batch decommissioning system 108, and the batch clearing system 110.

In one embodiment, the batch commissioning/decommissioning system 25 may be communicatively coupled to the controller 30, which is turn is communicatively coupled to various linking devices, such as the linking device 44, which may provide further communications with field devices, such as the field device 34. In other embodiments, the batch commissioning/decommissioning system 25 may be communicatively coupled to the controller 30, the linking device 44, and/or the field device 34.

In one example, a virtual placeholder 120 or virtual field device may be created using the system 25. The placeholder 120 may be an object stored in memory 16 that represents the field device 34. Accordingly, a user may pre-commission in batch mode a system by creating one or more of the placeholder 120, each of the placeholders 120 representing the device 34, and then use the placeholder(s) 120 during batch commissioning of the physical field device 34. The placeholder 120 may include physical device (PD) tag, manufacturer ID, device type, device revision, DD revision, and/or update revision representative of the field device 34. The PD tag may include a device name useful in identifying the device 34. Likewise, the manufacturer ID may include information identifying the manufacturer of the device 34. The device type may be suitable for identifying the type of device 34 (e.g., valve, sensor, actuator), while the device revision may be a version number identifying the device version. Likewise, the DD revision may identify the DD version, such as a DD file version included in the device 34. In another example, the device 34 may be commissioned (e.g., batch commissioned) without using the placeholder 120.

During commissioning activities, the field device 34 may first be communicatively coupled to the linking device 44, such as by using a cable to connect the field device 34 to one of the ports 60 of the linking device 44. The linking device 44 and/or field device 34 may then issue signals that the field device 34 is now a "live" device ready to participate in the control system 10. In certain embodiments, a "livelist" of live devices may be used and updated when a new device goes live (e.g., is connected to the control system 12). In this manner, multiple of the field devices (e.g., 34, 36, 38, and/or 40) may be physically connected to the H1 network 50.

The user may then use the batch commissioning system 106, for example, by interacting with the GUI 104, to commission one or more of the field devices 34, 36, 38, and/or 40. Advantageously, the techniques disclosed herein may derive certain states 122 for the noncommissioned field devices 34, 36, 38, and/or 40 and then use the states 122 for batch commissioning the devices 34, 36, 38, and/or 40. The states 122 may include an uninitialized state, in which the live device (e.g. 34, 36, 38, and/or 40) has assigned a temporary node ID (e.g., numbered 248-251, although other numbers can be used), and does not have assigned a permanent node ID or a physical device (PD) tag. The states 122 may additionally include an initialized state, in which the live device 34, 36, 38, and/or 40 has assigned a PD tag, also has assigned a temporary node ID (e.g., numbered 248-251, although other numbers may be used), but does not have assigned a permanent node ID. The states 122 may further include a mismatched state, in which the live device 34 has PD tag assigned and a permanent node ID (e.g., numbered 20-247, although other numbers may be used) assigned, however, no node address for the live device 34, 36, 38, and/or 40 may be found in the batch commissioning/decommissioning system 25 and/or no DD file 64 associated with the live device 34, 36, 38, and/or 40 may be found in the DD database 112.

The batch commissioning system 25 may commission the live devices 34, 36, 38, and/or 40 regardless of the state 122 (e.g., uninitialized, initialized, mismatched) that each of the devices 34, 36, 38, and/or 40 may be found in, as described in more detail below with respect to FIG. 3. The mismatch state of a device may include a device that has a permanent address and PD_TAG, but that the values for those parameters do not match any of the configured placeholders. If the PD_TAG matches but the address does not, the device can be batch-commissioned into the existing placeholder, and the device will have its address changed to match the placeholder. A device that is connected but for which no DD file is currently present in the control system is a different case. In this case, the DD file for the type of device connected must be downloaded into the control system, and a placeholder created using the DD file for the type of instrument, before commissioning activities can proceed. Accordingly, a fourth state 122, the commissioned state, may be assigned to the devices 34, 36, 38, and/or 40 upon commissioning. In this commissioned state, the live devices 34, 36, 38, and/or 40 may each have a PD tag assigned, and a permanent node ID assigned (e.g., numbered 0-247, although other numbers may be used), and a respective node address used by the batch commissioning/decommissioning system 25 may also be created. This node address for each device 34, 36, 38, and/or 40 may be allocated internal to the batch commissioning/decommissioning system 25 and used to "point" to the device in memory. During batch commissioning, the DD files 64, 66, 68, 70 for each device may be used to instantiate function blocks into the field devices 34, 36, 38, and/or 40. Once commissioned, the field devices 34, 36, 38, and/or 40 may then be used during operations of the control system 10.

The GUI 104 may also be used as an interface to the batch decommissioning system 108 to decommission the field devices 34, 36, 38, and/or 40. For example, once the live devices 34, 36, 38, and/or 40 are commissioned and operational, it may become desirable to replace or otherwise remove the devices from operations of the control system 12. Accordingly, the GUI 104 and batch decommissioning system 108 may be used, for example, to place the field devices 34, 36, 38, and/or 40 in the uninitialized state. Accordingly, the GUI 104 and the batch decommissioning system 108 may assign a temporary node ID (e.g., numbered 248-251, although other numbers may be used) to each of the devices 34, 36, 38, and/or 40. It is to be noted that each device would be assigned a different node ID. Additionally, the GUI 104 and the batch clearing system 110 may be used to "clear" the devices 34, 36, 38, and/or 40 by moving each of the devices 34, 36, 38, and/or 40 from the initialized state or the mismatched state into the uninitialized state. By deriving the states 122 and by enabling the transition between states, the batch commissioning/decommissioning system 25 may more efficiently enable the placement of one or more of the devices 34, 36, 38, and/or 40 into operation, and may more efficiently enable the removal and/or replacement of the devices 34, 36, 38, and/or 40.

Figure 3:
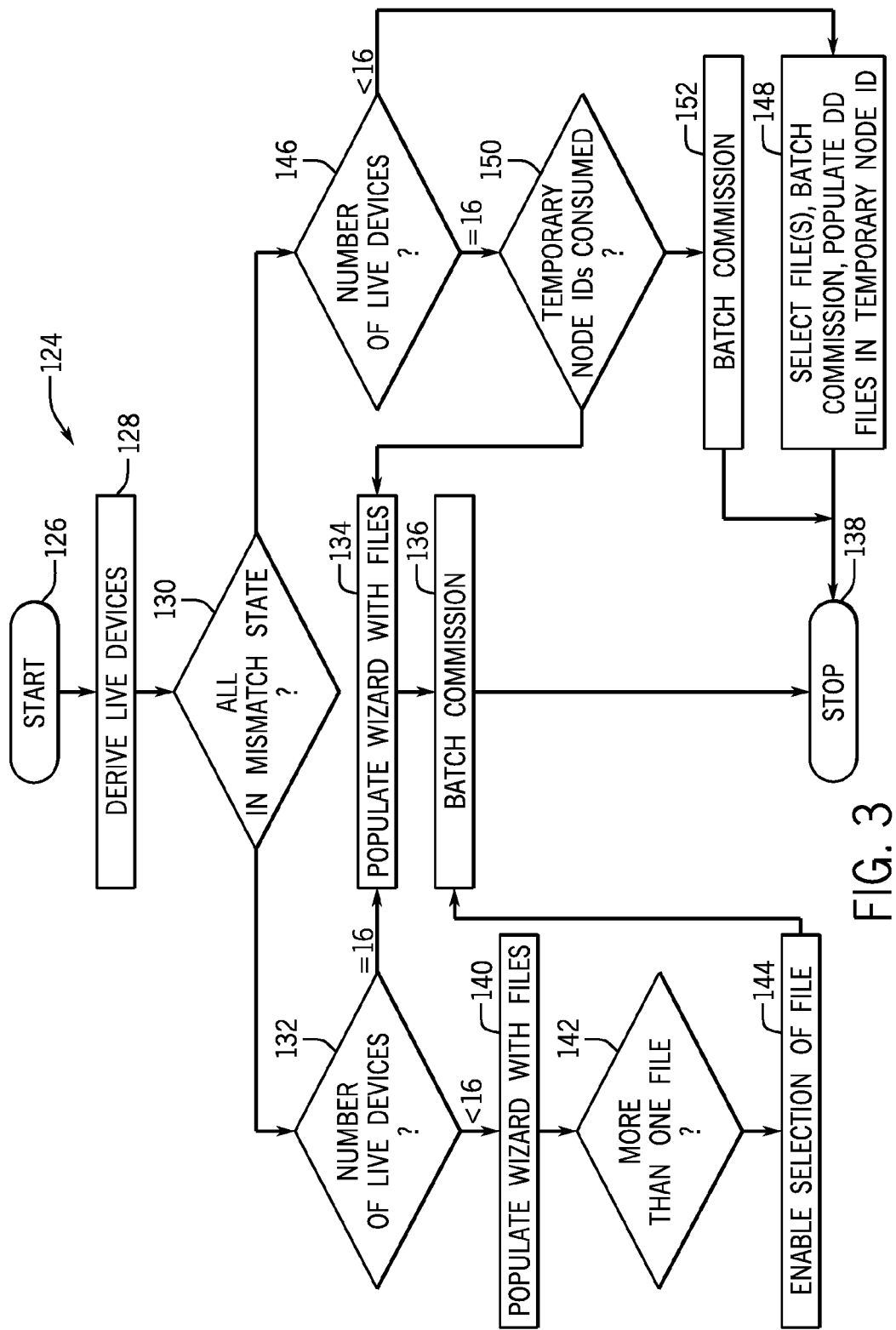
FIG. 3 is a flowchart of a process suitable for batch commissioning of field devices.

FIG. 3 is a flowchart of an embodiment of a process 124 suitable for batch commissioning the of field devices 34, 36, 38, and/or 40. The process 124 may be used by the batch commissioning/decommissioning system 25 to operatively couple the devices 34, 36, 38, and/or 40 so that the devices 34, 36, 38, and/or 40 may participate in control activities. More specifically, the user may select multiple of the devices 34, 36, 38, and/or 40 and the process 124 may then commission the selected devices as a batch, thus saving time when compared to individually selecting each device 34, 36, 38, and/or 40 and then individually commission the selected device. The process 124 may be stored in the memory 16 of the computer 12 as non-transitory tangible computer readable media including executable computer instructions configured to implement the process 124.

It is to be noted that the process 124 may generally apply or execute logic based on four cases. For case 1, if all the live devices (e.g., devices 34, 36, 38 and/or 40 physically connected to the H1 network 25) are under a decommission node (shown and described in more detail with respect to FIG. 5), the devices are in the mismatch state, and the number of live H1 devices under the decommission node is equal to a maximum desirable limit (e.g., 16, 18, 20, or more) when the batch commissioning operation is performed, the system 10 may populate all the applicable DD files of the corresponding live devices having similar manufacture ID, device type, device revision and latest available DD & common file format (CFF) revision. The live devices may then be associated with corresponding DD files and all live H1 devices under the decommission node are then commissioned into operation.

For case 2, if all the live devices (e.g., devices 34, 36, 38 and/or 40 physically connected to the H1 network 25) are under the decommission node, are in the mismatch state, and the number of these live devices under the decommission node is less than the maximum desirable limit (e.g., 16, 18, 20, or more) when the batch commissioning operation is performed, the system 10 may populate DD files of the corresponding live devices having similar manufacture ID, device type, device revision and all available DD and CFF revision. If there is only one DD file for each of the live devices undergoing batch commissioning, then the live devices may be associated with the single corresponding DD file and all the live devices listed under the decommission node are then commissioned. If there are one or more live devices (e.g., 34, 36, 38, and/or 4) that have more than one DD file, such as files populated with a different DD revision and/or CFF revision, the system 10 may then provide a mechanism where the user can select a desired DD file and then proceed with the batch commissioning process 124.

For case 3, if all the live devices (e.g., 34, 36, 38, and/or 4) displayed under the decommission node are in different states, such as the mismatch state, the initialized state, and/or the uninitialized state, the number of live devices under the decommission node is equal to the maximum desirable limit (e.g., 16, 18, 20 or more), and one or more of the temporary node IDs are allocated, then when the batch commissioning operation is performed the system 10 may automatically commission the mismatch devices with the corresponding DD files, and the devices that are in initialized or uninitialized state that are utilizing the temporary node IDs may be commissioned based on the manufacturer ID of the DD file.

For case 4, if all the live devices under the decommission node are in different states, such as the mismatch state, the initialized state, or the uninitialized state, the number of live devices under the decommission node is less than the maximum desirable number (e.g., 16, 18, 20, or more), and one or more of the temporary node IDs are used, when the batch commissioning operation is performed, the host may automatically commission the mismatched devices with relevant DD Files and the commissioning wizard may populate DD files for the devices in the temporary node ID based on the manufacturer ID and the user may be provided with an option to select the DD files, for example, based on device type, device revision, and/or DD revision In the illustrated embodiment, the process 124 may begin (block 126) by deriving (block 128) any devices physically connected to the linking device 44 and thus appear in the livelist. The process 124 may then derive the state (e.g. mismatch, initialized, uninitialized) of the live devices 34, 36, 38, 40 found to determine (decision 130) if all live devices are in the mismatch state. If all devices are in the mismatch states (decision 130) then the process 124 may determine (decision 132) a number of live devices 34, 36,

38, 40. If the number of live devices 34, 36, 38, 40 is equal to a desired maximum (e.g., 16, 18, 20, or more), then the process 124 may populate (block 134) the batch commissioning wizard 114 with DD files (e.g., 64, 66, 68, 70) of live devices that have similar manufacture ID, device type, and/or device revision, and latest available DD & CFF revision. The process 124 may then batch commission (block 136) all live devices 34, 36, 38, 40 with the populated files, for example, by using the batch commissioning wizard 114. The process 124 may then stop execution (block 138).

If the number of live devices 34, 36, 38, 40 (decision 132) is less than a desired maximum (e.g., 16, 18, 20, or more), then the process 124 may populate (block 140) the batch commissioning wizard 114 with DD files (e.g., 64, 66, 68, 70) of live devices that have similar manufacture ID, device type, and/or device revision, and all the available DD & CFF revisions for all the live devices 34, 36, 38, 40. The process 124 may then determine (decision 142), if 1 or more live devices have more than 1 DD file having different DD and/or CFF revision. In other words, the process 124 may determine (decision 142) if any live devices may be commissioned by using more than one file. If there are (decision 142) more than one files useful in commissioning, the process 124 may then enable the selection of a file (block 144), for example, by providing the GUI 104 having a file list of the files useful in commissioning. The process 124 may then batch commission (block 136) all live devices 34, 36, 38, 40 with the populated files, including the file selected at block 144, and the stop execution (block 138).

Turning now to decision 130, if some live devices are not in the mismatch state, for example, some devices are in the initialized or uninitialized state, then the process may determine (decision 146) a number of live devices 34, 36, 38, 40. If the number of live devices (decision 146) is less than a desired maximum number (e.g., 16, 18, 20, or more), then the process 124 may enable the selection of a file (block 148), for example, by providing the GUI 104 having a file list of the files useful in commissioning, and then batch commission (block 148) the devices 34, 36, 38, 40 with relevant DD files. The commissioning wizard 114 may additionally populate (block 148) DD files for the devices in the temporary node ID during the batch commissioning based on, for example, manufacturer ID. The process 124 may then stop execution (block 138).

If the number of live devices (decision 146) is equal to a desired maximum (e.g., 16, 18, 20, or more), then the process 124 may determine (decision 150) if the temporary node IDs are all consumed. If the temporary node IDs are all consumed (decision 150), the process 124 may then batch commission (block 152) the mismatched devices with relevant DD files and the devices with temporary node IDs may then be commissioned (block 152) based on the manufacturer ID of the DD file. The process 124 may then stop execution (block 138). If the temporary node IDs are not consumed (decision 150), the process 124 may continue execution at block 134 as described in more detail above. By providing for the process 124, the techniques described herein may enable the batch commissioning of live devices in a variety of states, including initialized, uninitialized, and/or mismatched states.

Figure 4:
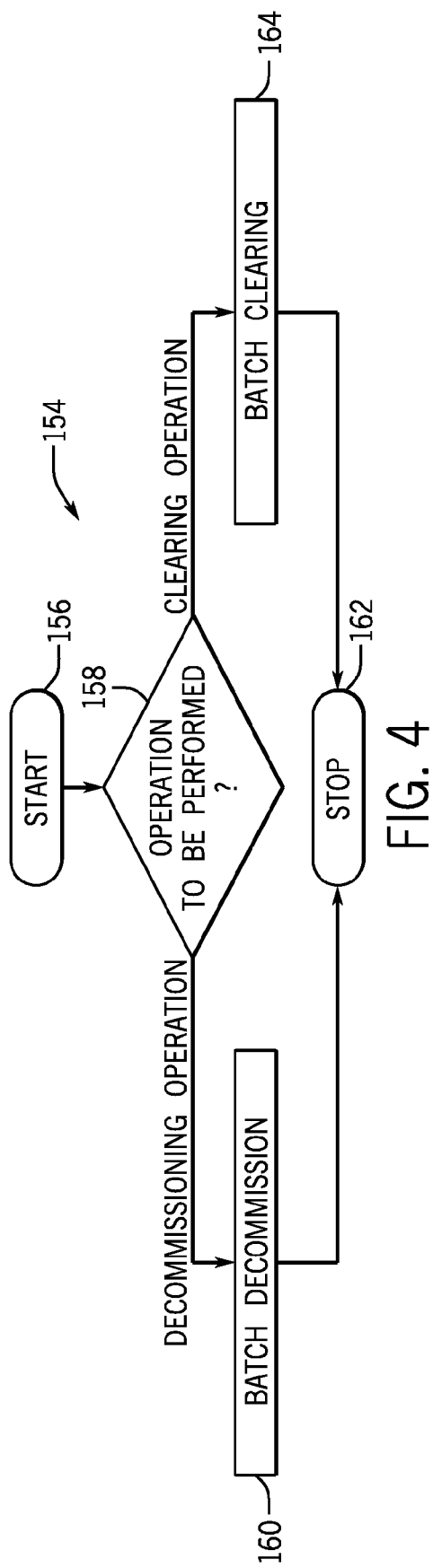
FIG. 4 is a flowchart of a process suitable for batch decommissioning/clearing of field devices.

FIG. 4 is a flowchart of an embodiment of a process 154 suitable for batch decommissioning and/or clearing the of field devices 34, 36, 38, and/or 40. The process 154 may be used by the batch commissioning/decommissioning system 25 to operatively decouple the devices 34, 36, 38, and/or 40 so that the devices 34, 36, 38, and/or 40 may no longer participate in control activities. More specifically, the user may select multiple of the devices 34, 36, 38, and/or 40 and the process 154 may then decommission the selected devices as a batch, thus saving time when compared to individually selecting each device 34, 36, 38, and/or 40 and then individually decommission the selected device. The process 154 may be stored in the memory 16 of the computer 12 as non-transitory tangible computer readable media including executable computer instructions configured to implement the process 154.

The process 154 may begin (block 156) by determining (decision 158) which operation to perform, e.g., batch decommissioning (block 160) or batch clearing (block 162). If batch decommissioning is desired (decision 158), then the process 154 may populate all selected live devices in the decommissioning wizard 116, and, depending on the available number of temporary node IDs, the user may select up to a desired number (e.g., 4, 5, 6, 7, or more) of devices 34, 36, 38, 40 for decommissioning. The process 154 may then derive the number of temporary nodes being currently used. As mentioned before, certain devices may be assigned or otherwise allocated to temporary nodes (e.g., numbered 248-251), for example, to be used during later commissioning activities. If the process 154 determines that there are four temporary nodes already in use, then the process 154 may ask the user to free at least one node. Once the user frees at least one node, the process 154 may then decommission the device from the controller 30 and/or the linking device 44. Likewise, if the four temporary nodes are not in use and there is a free node, the process 154 may decommission the devices. It is to be understood that, in other embodiments, more or less than four temporary nodes may be used. During decommissioning (block 160), the device 34 may be placed into the uninitialized state so that the controller 30 and/or the linking device 44 are aware that the device is no longer participating in control activities. The process 154 may then stop execution (block 162).

If batch clearing is desired (decision 158), then the process 154 may transition between the states of the devices 34, 36, 38, and/or 40, for example, from the mismatched state or from the initialized state to the uninitialized state (block 164). In this manner, the devices 34, 36, 38, and/or 40 may be placed in better condition for commissioning at a later time. The process 154 may be stored in the memory 16 of the computer 12 as non-transitory tangible computer readable media including executable computer instructions configured to implement the process 154. The mismatch live devices may be populated in the decommissioning wizard 116 (block 164). Depending on the available temporary node IDs, a user may select up to a desired number of devices (e.g., 4, 5, 6, 7, or more) for batch clearing. Indeed, the process 154 may derive (block 170) the number of temporary nodes being currently used.

As mentioned before, certain devices may be assigned or otherwise allocated to temporary nodes (e.g., nodes numbered 248-251), for example, to be used during later commissioning activities. If the during clearing (block 164) the process 154 determines that there are four temporary nodes already in use, then the process 154 may ask the user to free at least one node. Once the user frees one or more nodes, the process 154 may then transition the devices' state from the initialized state or from the mismatched state into the uninitialized state, and then stop (block 162). Accordingly, the devices 34, 36, 38, 40 may be cleared for subsequent use. By providing for batch decommissioning and clearing of multiple devices, the techniques described herein may more efficiently manage operations of the system 10.

Figure 5:
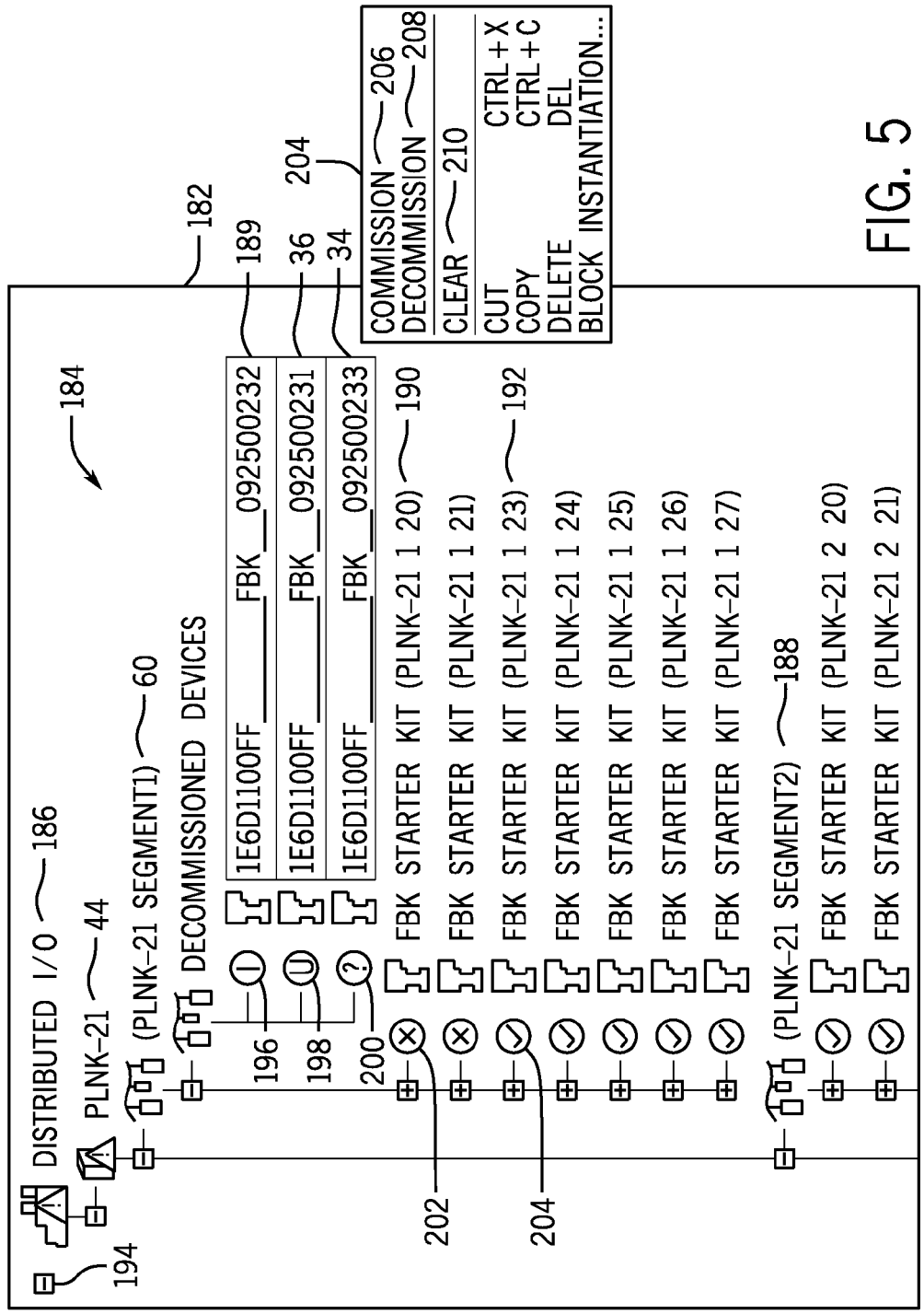
FIG. 5 is a view of an embodiment of a hierarchical control useful in visualizing field device information for use in batch commissioning, decommissioning, and or clearing processes.

FIG. 5 is an embodiment of a screen 182 having a hierarchical display 184 suitable for displaying certain components of the control system 10, including a distributed I/O 186 of the controller 30, linking devices 44, 54, segments 60, 188, and devices, such as devices 34, 36, 189, 190, 192. The screen 182 may be included in the GUI 104 of the batch commissioning/decommissioning system 25, and may be used as an interface to view the status of the various devices 34, 36, 189, 190, 192, as well as to batch commission, decommission, and clear the various devices 34, 36, 189, 190, 192. The screen 182 may be implemented by using computer code or executable instructions stored in a machine-readable medium, such as the memory 16 of the computer 12, and provided by the HMI 18, MES 20, DCS 22, and/or SCADA 24.

In the depicted embodiment, the screen 182 uses a hierarchical tree control 194 suitable for displaying a tree structure. For example, the root is displayed as the distributed I/O 186 of the controller 30, and the next level of the tree includes the linking device 44. The level under the linking device 44 additionally includes the segments 60 and 188, while each displayed segment 60 and 188 may include further details associated with the segment, such as field devices 34, 36, and so on. Additionally, certain icons 196, 198, 200, 202, and 204 may be used to display information associated with the devices 189, 36, 34, 190, and 192, respectively. For example, the "checkmark" icon 204 may be used to denote that the device 192 is commissioned and operating in the control system 10. Likewise, the icon 202 may be used to indicate that the device 190 is not yet connected (e.g., is not a "live" device) to the control system 10. Status information for the live devices 189, 34, and 36, may be provided by the icons 196, 198, 200 denoting the initialized status, the uninitialized status, and the mismatched status, respectively. Accordingly, a decommission node labeled "Decommissioned devices" may include all decommissioned live devices 34, 36, 189. By providing the icons 196, 198, 200, 202, and 204, the screen 182 may more efficiently provide status information, as well as the hierarchy of interconnected components of the control system 10.

Further depicted in FIG. 6 is context menu 204 useful in selecting various processes, such as the batch commissioning process 124, and the decommissioning and the clearing process 154. In use, a mouse may be used to multiselect various devices for batch operations, such as the device 34, 36, and 189, and a GUI action, such as a mouse right click, may be used to display the context menu 204. It is to be noted that other actions, such as keyboard actions, voice command actions, and so forth, may be used to display the context menu 204. A menu item 206 labeled "commission" may be used to execute the batch commissioning process 124 for the selected devices 34, 36, 189. Likewise, a menu item 208 labeled "decommission" may be used to execute the batch decommissioning block 160 of the batch decommissioning/clearing process 154 for the devices 34, 36, 189. Similarly, a menu item 210 labeled "clear" may be used to execute the clearing block 164 of the decommissioning/clearing process 154 for the devices 34, 36, 189. In some cases, one or more of the menu items 206, 208, 210 may be disabled, and shown as inactive (e.g., "grayed out") in the context menu 204. By providing visual displays of devices and their associated states, and contextual menus 204 useful in providing visual indications of processes suitable for execution, the screen 182 may more efficiently enable the batch commissioning, decommissioning, and clearing of field devices.

Technical effects of the invention include batch commissioning, batch decommissioning, and batch clearing of field devices by using device state information, including a mismatched state, an uninitialized state, an initialized state, and a commissioned state. Systems and methods are also provided to visualize the aforementioned state information in hierarchical displays suitable for enabling the execution of batch commissioning, batch decommissioning, and/or batch clearing processes. Icons are also provided, that depict field device state information in visual manner that may present state information in more efficient manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory tangible computer-readable medium comprising executable code, the executable code comprising instructions for:
   providing a batch commissioning system configured to operatively couple at least two field devices to a control system;
   providing a batch decommissioning system configured to operatively uncouple the at least two field devices from the control system; and
   providing a graphical user interface (GUI) configured to use the batch commissioning system, the batch decommissioning system, or a combination thereof, to select, on a display, the at least two field devices, and to communicatively interface with the control system to operatively couple, uncouple, or a combination thereof, the at least two field device from the control system, wherein a first field device of the at least two field devices comprises a mismatch state, and wherein the mismatched state comprises a physical device (PD) tag assigned to the first field device, a permanent node ID assigned to the first field device, and no node address corresponding to a live device, and wherein the batch commissioning system is configured to transition the first field device from the mismatch state into a commissioned state if the first field device is determined to be in the mismatch state.

2. The non-transitory tangible computer-readable medium of claim 1, wherein the batch commissioning system is configured to determine if a first permanent node identification (ID) assigned to the first field device is available for commissioning, and if the first permanent node ID is available, then to assign a first physical device (PD) tag to the first field device and to skip a second permanent node ID deletion and a second permanent node ID reassignment.

3. The non-transitory tangible computer-readable medium of claim 1, wherein the at least two field devices comprise a plurality of field device states and wherein the plurality of field device states each comprise only the mismatch state, an uninitialized state, an initialized state, and a commissioned state.

4. The non-transitory tangible computer-readable medium of claim 1, comprising instructions for communicatively coupling the at least two field devices to the control system via a linking device.

5. The non-transitory tangible computer-readable medium of claim 1, wherein the GUI comprises a hierarchical control configured to display visualizations representative of a linking device, the at least two field devices, a plurality of field device states, or a combination thereof.

6. The non-transitory tangible computer-readable medium of claim 5, wherein the visualizations representative of the plurality of field device states comprise a plurality of graphical icons.

7. The non-transitory tangible computer-readable medium of claim 1, wherein the instructions comprise instructions for communicating between a high speed Ethernet network and a Foundation H1 network via a linking device, wherein the linking device is configured to link the high speed Ethernet network to the Foundation H1 network, and the at least two field devices are attached to the Foundation H1 network.

8. The non-transitory tangible computer-readable medium of claim 1, wherein the instructions comprise a virtual placeholder representative of a first field device of the at least two field devices, wherein the commissioning system is configured to use the virtual placeholder to commission the first field device.

9. The non-transitory tangible computer-readable medium of claim 1, comprising instructions to control a turbine system, a power generation system, or a combination thereof.

10. A method, comprising:
detecting the coupling of a first field device to a control system;
detecting the coupling of a second field device to the control system;
determining a first state for the first field device;
determining a second state for the second field device; and
batch commissioning, batch decommissioning, batch clearing, or a combination thereof, the first and the second field devices, wherein the first field device comprises a mismatch state, and wherein the mismatch state comprises a physical device (PD) tag assigned to the first field device, a permanent node ID assigned to the first field device, and no node address corresponding to a live device, and wherein the batch commissioning system is configured to transition the first field device from the mismatch state into a commissioned state if the first field device is determined to be in the mismatch state.

11. The method of claim 10, wherein the batch commissioning occurs if the first and second field devices are both in the mismatch state and the batch commissioning comprises populating device description (DD) files associated with the first and second field device in a batch commissioning wizard based on manufacture ID, device type, device revision, DD and common file format (CFF) revision, or a combination thereof, and using the DD files to commission the first and the second field devices.

12. The method of claim 11, wherein the batch commissioning occurs if one of the first or the second field devices is in a uninitialized or an initialized state and the batch commissioning comprises utilizing at least one temporary node ID.

13. The method of claim 10, wherein the batch commissioning comprises assigning a first permanent node identification (ID) and a first physical device (PD) tag to the first field device if the first field device is not in the mismatch state, wherein assigning the first permanent node ID and the first PD tag transitions the first field device to a commissioned state.

14. The method of claim 10, wherein batch decommissioning comprises deriving a number of temporary nodes currently in use and providing a facility to release a first temporary nodes if the number is equal to a maximum value.

15. A system comprising:
a processor configured to:
detect the coupling of a first field device to a control system;
detect the coupling of a second field device to the control system;
determine a first state for the first field device;
determine a second state for the second field device; and
batch commission, batch decommission, batch clear, or a combination thereof, the first and the second field devices, wherein the first field device comprises a mismatch state, and wherein the mismatch state comprises a physical device (PD) tag assigned to the first field device, a permanent node ID assigned to the first field device, and no node address corresponding to a live device, and wherein the batch commissioning system is configured to transition the first field device from the mismatch state into a commissioned state if the first field device is determined to be in the mismatch state.

16. The system of claim 15, wherein the processor is configured to batch commission if the first and second field devices are both in the mismatch state and the batch commissioning comprises populating device description (DD) files associated with the first and second field device in a batch commissioning wizard based on manufacture ID, device type, device revision, DD and common file format (CFF) revision, or a combination thereof, and using the DD files to commission the first and the second field devices.

17. The system of claim 15, wherein the wherein the processor is configured to batch commission if one of the first or the second field devices is in a uninitialized or an initialized state and the batch commissioning comprises utilizing at least one temporary node ID.

18. The system of claim 15, wherein batch clearing comprises transitioning the first and the second field devices to an uninitialized state.

* * * * *